US009752754B2

(12) United States Patent
Trincia et al.

(10) Patent No.: US 9,752,754 B2
(45) Date of Patent: Sep. 5, 2017

(54) LUMINAIRE EXHIBITING SECONDARY GLOW CHARACTERISTICS

(71) Applicant: ABL IP Holding, LLC, Conyers, GA (US)

(72) Inventors: Nicholas R. Trincia, San Francisco, CA (US); Xiaoping Wu, Richmond, CA (US)

(73) Assignee: ABL IP Holding, LLC, Conyers, GA (US)

( * ) Notice: Subject to any disclaimer, the term of this patent is extended or adjusted under 35 U.S.C. 154(b) by 64 days.

(21) Appl. No.: 14/723,416

(22) Filed: May 27, 2015

(65) Prior Publication Data

US 2015/0345743 A1 Dec. 3, 2015

Related U.S. Application Data

(60) Provisional application No. 62/004,025, filed on May 28, 2014.

(51) Int. Cl.

| | |
|---|---|
| ***F21V 7/04*** | (2006.01) |
| ***F21V 15/01*** | (2006.01) |
| ***F21V 5/04*** | (2006.01) |
| ***F21S 4/00*** | (2016.01) |
| ***F21V 8/00*** | (2006.01) |
| ***F21V 7/00*** | (2006.01) |
| ***F21S 4/28*** | (2016.01) |
| *F21Y 103/10* | (2016.01) |
| *F21Y 115/10* | (2016.01) |

(52) U.S. Cl.
CPC ............ *F21V 7/0091* (2013.01); *F21S 4/008* (2013.01); *F21S 4/28* (2016.01); *F21V 5/043* (2013.01); *F21V 5/048* (2013.01); *F21V 15/01* (2013.01); *F21V 2200/00* (2015.01); *F21Y 2103/10* (2016.08); *F21Y 2115/10* (2016.08)

(58) Field of Classification Search
CPC ........ F21V 7/0091; F21V 5/048; F21V 15/01; F21V 15/013; F21V 5/043; F21V 2200/00; F21K 9/17; F21K 9/27; F21S 4/28; F21Y 2103/10; F21Y 2115/10
See application file for complete search history.

(56) References Cited

U.S. PATENT DOCUMENTS

| | | | | |
|---|---|---|---|---|
| 3,491,245 | A | 1/1970 | Hardesty | |
| 6,367,956 | B1 * | 4/2002 | Becker | B60Q 3/0286 362/293 |
| 6,536,921 | B1 * | 3/2003 | Simon | F21S 6/005 362/268 |
| 7,708,444 | B2 | 5/2010 | Sakai et al. | |

(Continued)

*Primary Examiner* — Alan Cariaso

(74) *Attorney, Agent, or Firm* — Beeson Skinner Beverly, LLP

(57) ABSTRACT

A luminaire includes a housing having at least one sidewall with an observable outer surface and a light feed edge. The housing sidewall is characterized in that light introduced through a light feed edge of the sidewall will propagate by internal reflections through the sidewall and will be extracted from the outer surface of the sidewall. A fractional amount of light emitted by the luminaire's light source is directed to the sidewall's light feed edge. When extracted, this fractional amount of source light produces an observable and aesthetically pleasing glow of light on the sidewall of the housing.

31 Claims, 5 Drawing Sheets

(56) References Cited

U.S. PATENT DOCUMENTS

| | | | | |
|---|---|---|---|---|
| 8,761,565 | B1 * | 6/2014 | Coleman | F21K 9/13 362/335 |
| 9,057,493 | B2 * | 6/2015 | Simon et al. | F21S 4/008 |
| 2007/0121340 | A1 | 5/2007 | Hoshi | |
| 2010/0046217 | A1 | 2/2010 | Ngai | |
| 2010/0220497 | A1 | 9/2010 | Ngai | |
| 2014/0140096 | A1 * | 5/2014 | Van Bommel | F21V 3/0463 362/609 |

* cited by examiner

D202N-185.B

1 / 5

37
25
25
40
11
40
39
30
23
23
24

LUMINAIRE EXHIBITING SECONDARY GLOW CHARACTERISTICS

CROSS-REFERENCE TO RELATED APPLICATIONS

This application claims the benefit of U.S. provisional patent application No. 62/004,025 filed May 28, 2014.

BACKGROUND

The present invention generally relates to luminaires and more particularly to luminaires that are suspended or mounted in an architectural space and that become an architectural element within the space.

Suspended and mounted luminaires used for architectural lighting have two basic functions: to effectively light the space and to provide physical forms within the space that are aesthetically pleasing. A wide variety of luminaires and luminaire types are available to a lighting designer to achieve specific lighting and architectural goals. These include luminaires that provide direct lighting or indirect lighting, or that provide both direct and indirect lighting from the same luminaire. The luminaires typically include light sources and optics supported in a housing that dominates the luminaire's physical form and that contributes to its aesthetic appeal. The housing is typically opaque with its visual appearance being characterized by the shape of the housing and how light within the space washes the housing exterior surfaces. In many lighting environments the exterior housing surfaces will be dark or exhibit shadows, and generally there is little the lighting designer can do to change its appearance other than change the light distribution within the space.

The present invention provides a luminaire wherein the exterior surface of the luminaire housing will exhibit a uniform glow characteristic independent of external lighting conditions in the space in which the luminaire is used. This characteristic is achieved by uniquely cycling a small fraction of the light emitted by the luminaire's light source or sources into a wall or walls of the luminaire housing and by extracting this captured light through the exterior surface or surfaces of the walls. The invention provides a lighting designer with an added tool for creating aesthetically pleasing lighting systems within an architectural space. This facility is achieved in a luminaire with relatively simple optical systems that are easy to clean and maintain.

SUMMARY OF INVENTION

The invention is directed to a luminaire that exhibits secondary glow characteristics produced by a fractional amount of the light from the luminaire's light source. The luminaire includes a housing having at least one sidewall with an observable outer surface and a light feed edge. The housing sidewall is characterized in that light introduced through the light feed edge of the sidewall will propagate by internal reflections within the sidewall and will be extracted from the outer surface of the sidewall. This extracted fractional light produces an observable glow of light from the luminaire housing. The luminaire includes at least one light source in the housing, and optical control means, such as a lens element, positioned proximate the light source. The optical control means is formed to direct most of the light emitted by the light source out of the housing in a light distribution pattern that illuminates a space. The optical control means directs a smaller, fractional portion of the light emitted by the luminaire's light source to the light feed edge of the housing sidewall. The portion of light which is directed to the light feed edge of the housing sidewall is introduced into the sidewall through the sidewall's light feed edge to cause secondary glow characteristics on the outer observable surface of the housing sidewall as it is extracted from the sidewall.

DETAILED DESCRIPTION OF ILLUSTRATED EMBODIMENT

Figure 1:
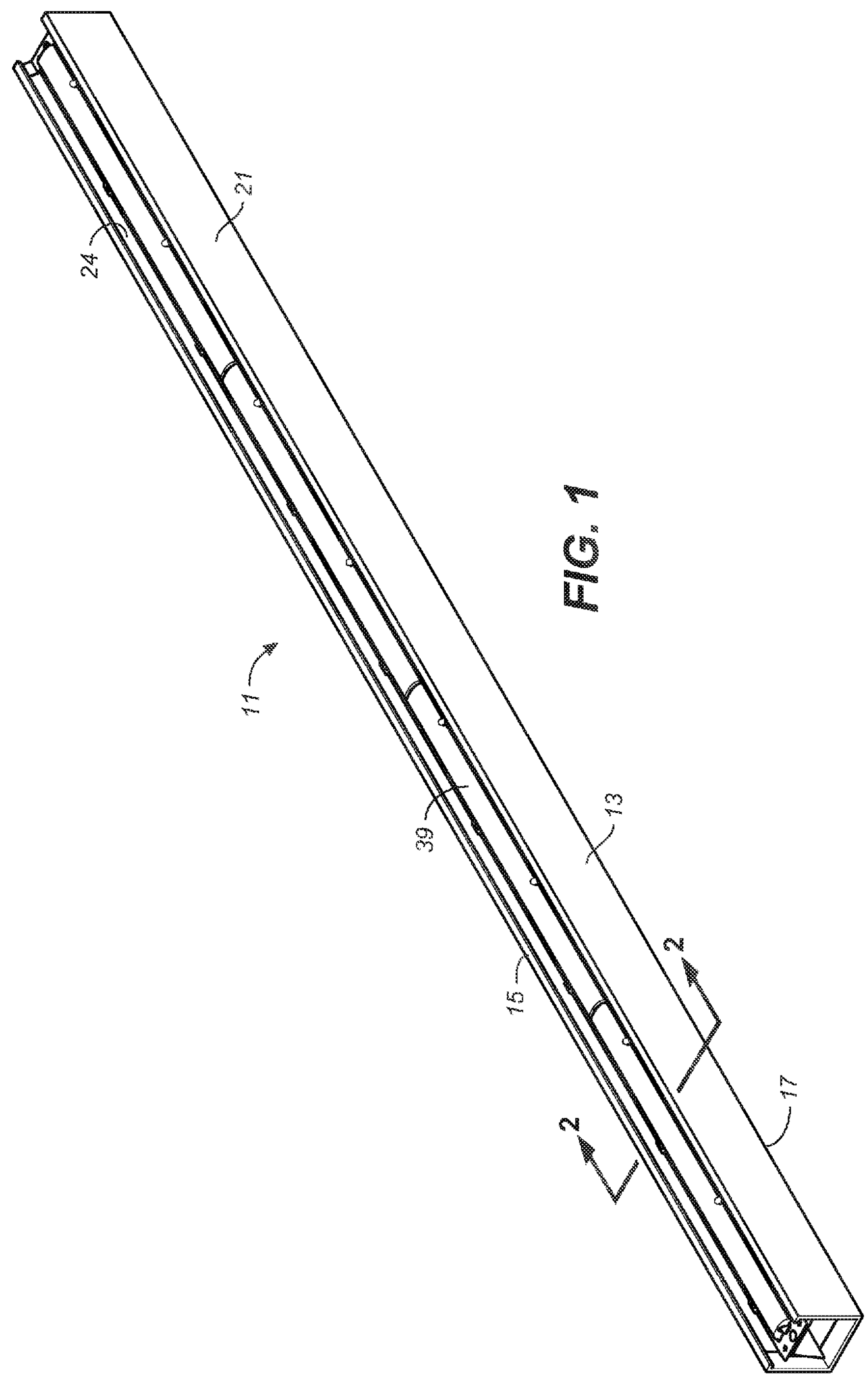
FIG. 1 is a top perspective view of a linear luminaire that will exhibit secondary glow characteristics in accordance with the invention.

The present invention is adapted for use in a luminaire having a housing that typically supports and substantially encloses the internal parts of the luminaire, including the luminaire's light source or sources, optical control elements, wiring and other hardware. The housing shape will generally give the luminaire its characteristic shape and dominate the physical appearance of the luminaire. The invention has particular application for linear lighting systems where the luminaires and their housings have a linear form, in this case a symmetrical rectangular linear form with linear housing walls on either side of the vertical center plane of the housing; however, the invention could be adapted to other luminaire forms as well.

As used herein, the reference to "light source" will be understood to refer to one or more sources of light.

The accompanying drawings illustrate a linear form luminaire in which the invention is implemented. Referring to the drawings, luminaire 11 is seen to include a linear housing 13 having a rectangular cross-sectional shape, and a top 15 and a bottom 17 through which the luminaire produces direct and indirect lighting as hereinafter described. The bottom of the housing is formed by bottom wall 19 and the sides of the housing are formed by upwardly extending vertical sidewalls 21. At least one of the sidewalls, and preferably both the sidewalls and bottom wall, are fabricated of a transparent material, such as a clear acrylic plastic, through which light can travel.

Figure 2:
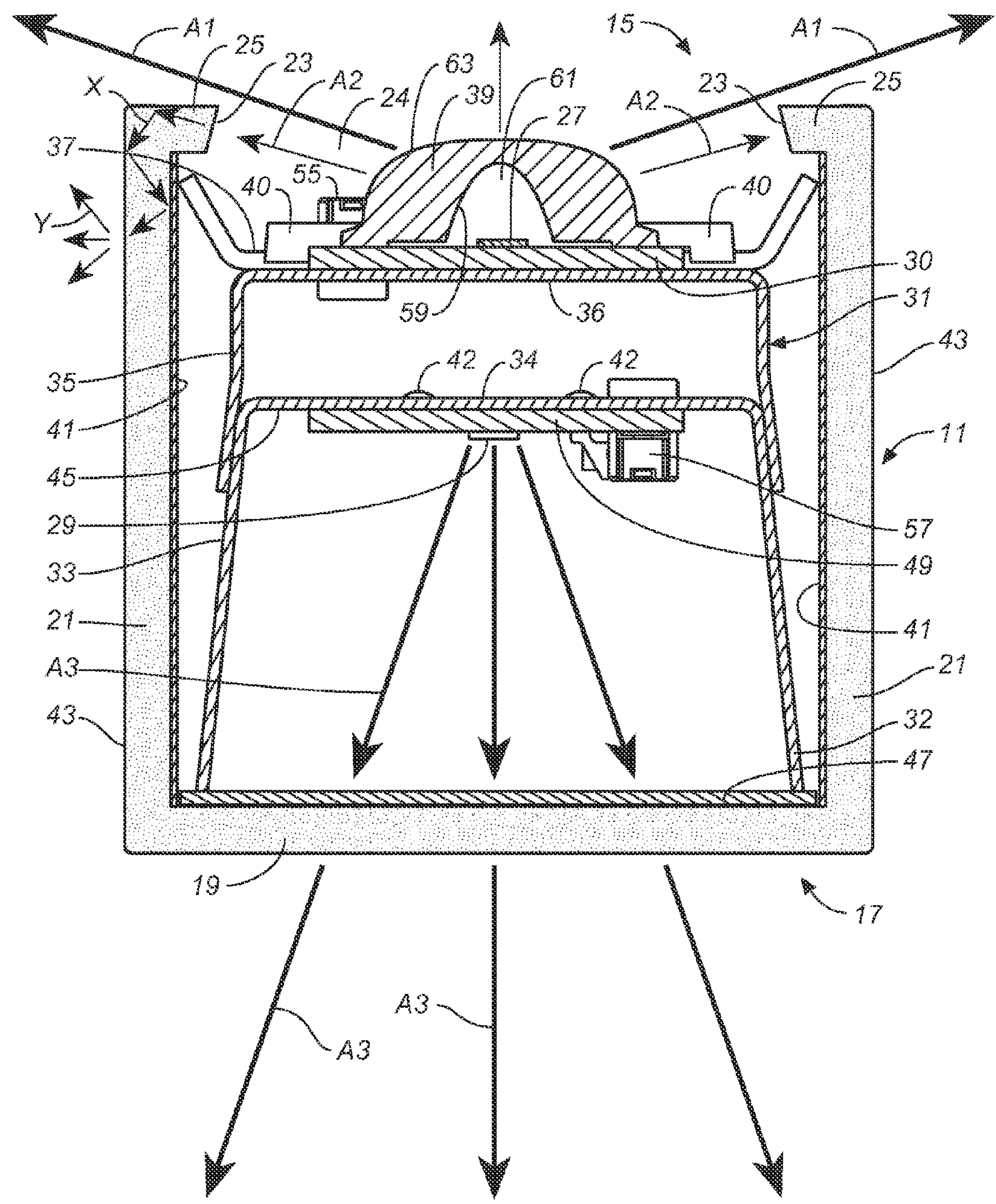
FIG. 2 is a cross-sectional view thereof taken along lines 2-2 in FIG. 1, and which illustrates the principle of the invention.
Figure 3:
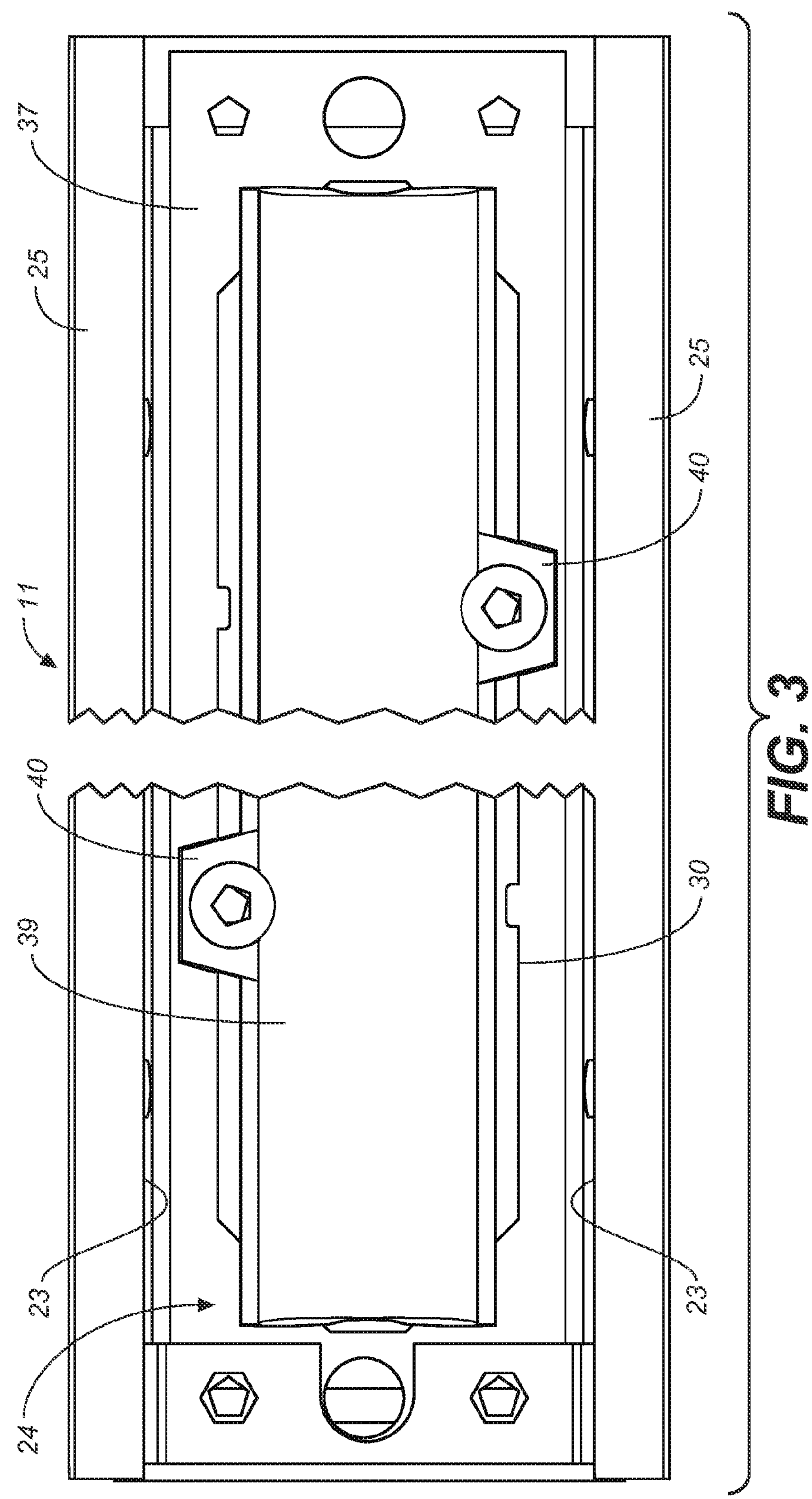
FIG. 3 is an enlarged top plan view thereof.

The sidewalls 21 have exposed light feed edges 23. In the illustrated embodiment, these exposed edges are found at the top of the housing and define the housing's top opening 24. They are provided on inwardly turned lips 25 at the top of the housing sidewalls so as to orient the light feed edges generally in the direction of source light emitted through the top opening of the housing. (The light feed edges for the housing sidewalls could be found at other locations on the housing sidewalls as later discussed.) By introducing source light into the sidewalls through the light feed edges as later described, light will propagate within the sidewalls, or in other words be piped down the sidewalls, by internal reflections for later extraction. Such internal reflections are denoted by internal reflection arrows X seen in FIG. 2. Light extracted from the sidewalls is denoted by the light emission arrows Y in FIG. 2.

The light sources of the luminaire are preferably small area light sources, which permit directional control over the light emitted by the sources. In the illustrated embodiment, the light sources are in the form of strips containing a plurality of LEDs, namely, a top strip 27 facing the top opening 24 of the luminaire's linear housing 13 and a bottom strip 29 of LEDs facing the bottom of wall of the housing. The LED strips are suitably mounted on LED boards 30, 49, which are in turn mounted to an elongated bracket assembly 31 disposed in the housing. The bracket assembly is seen to be comprised of a bottom inverted U-shaped bracket 33 having a top wall 34, a top inverted U-shaped bracket 35 having a top wall 36, and an upper reflector plate 37 which can have angled upturned edges. The bracket assembly is sized to fit within housing 13 with the bottom legs 32 of the bottom inverted U-shaped bracket resting above the bottom wall 19 of the housing and with the upper reflector plate tucked down below the inwardly turned lips 25 at the top of the housing.

The top LED board 49 is mounted to the top of the upper reflector plate 37, and preferably extends down the center of the reflector plate. Optical control means, suitably in the form of an elongated horseshoe shaped lens 39 and suitably fabricated of a clear acrylic plastic, is mounted over the strip of LED light sources for spreading the light emitted from the LEDs. The horseshoe lens, which can be attached to the reflector plate by edge clips 40, straddles the centrally mounted LED strip 27. The lens is seen to include an internal curved light incident surface 59 defining a bottom cavity 61 and an external curved light exiting surface 63. It is further seen that the LEDs of LED strip 27 are positioned in relation to the bottom cavity of horseshoe lens 39 such that the light emitted by the LEDs enters the lens through light incident surface 59. The light incident surface and light exiting surfaces of the lens produce a lens contour that spreads most of the LED light entering the lens overhead and to the sides of the luminaire in a batwing distribution of light, as denoted by the large arrows A1 in FIG. 2. However, a portion of the light exiting the lens, denoted by the smaller low angle arrows A2, is directed by the lens toward the exposed light feed edges 23 of the in-turned lips at the top of the housing sidewalls where this smaller portion of light is injected into the sidewalls. Generally, it is contemplated that no more than about five percent of the available light from the top strip of LEDs will need to be injected into the sidewalls to produce an observable glow on the sidewalls.

The inside wall of each of the sidewalls of housing 13 can be provided with an opaque or substantially opaque reflective layer 41, which, for example, could be a specular reflector placed on the back of the sidewalls or a co-extruded white opaque reflective layer. A diffusing medium can be provided to extract the light from the sidewalls of the housing as it travels down the sidewalls. For example, a Satin Ice™ acrylic plastic, which has micro-particles suspended in the plastic, could be used as the sidewall material. Alternatively, the outer surface of the sidewalls could be provided with a satin finish. The result will be that the extracted light, denoted by light emission arrows Y in FIG. 2, will produce an aesthetically pleasing observable glow on the sidewalls.

In addition to indirect light, luminaire 11 also produces direct lighting or down-light. The down-light is produced through the transparent bottom wall of the luminaire's housing 13 as denoted by the arrows A3. The down-light comes from the bottom strip 29 of LEDs on LED board 30 attached via fastening means, such as screw fasteners 42, to the underside 45 of the top wall 34 of the bottom inverted U-shaped bracket of bracket assembly 31. To produce a uniform and glare-free light distribution pattern from the bottom of the luminaire, suitable means can be provided for diffusing the down light as it passes through the transparent bottom wall of the luminaire's housing. A micro-prismatic diffuser lens, such as the illustrated lens 47, can be added to the inside of the bottom wall of the luminaire housing for this purpose.

Figure 4:
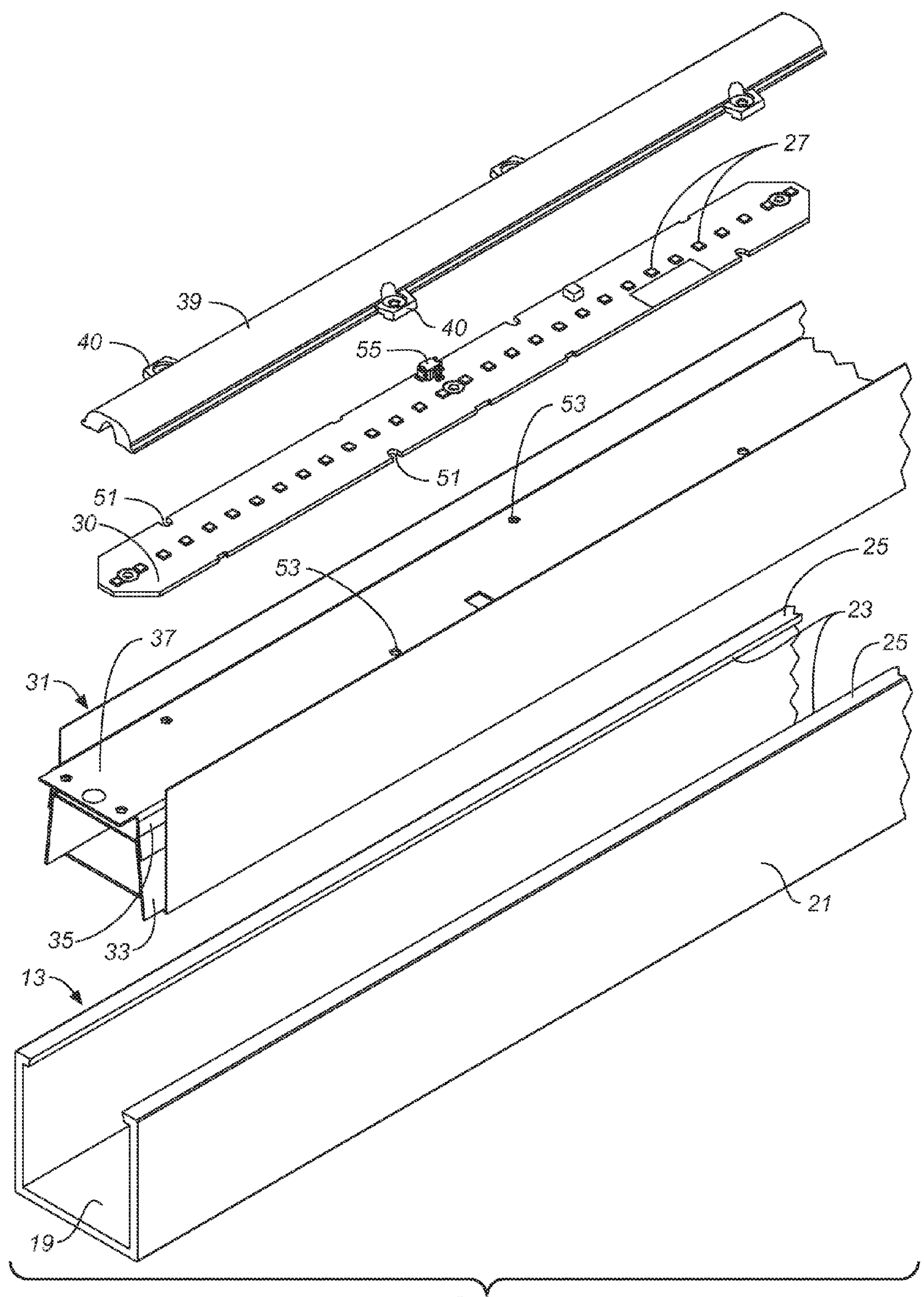
FIG. 4 is an exploded view thereof illustrating different parts of the luminaire.

FIG. 4 illustrates the relatively simple assembly of luminaire 11. The elongated bracket assembly, which could be a unitary structure instead of the three part structure as shown, is placed in the housing, lower bracket down, so that the legs of the lower bracket rest against the bottom wall of the housing. (The diffuser lens at the bottom of the housing is not shown in FIG. 4, nor is the bottom LED board 30, which is attached to the underside of the bracket assembly as described above.) The top LED board is placed on top of the reflector plate 37 so that the cut-outs 51 in the edge of the board align with corresponding fastener holes 53 in the reflector plate. The elongated lens 39 is then placed down over the LED board and secured by edge clips 40 by screwing the edge clips into the fastener holes 53 in the reflector plate.

It is noted that each of the LED boards 30, 49 can be provided with a suitable wire connector, such as wire connector 55 shown on the top of LED board 30 and wire connector 57 shown on the bottom of LED board 57. The wire connectors allow for electrical wires (not shown) from a power cord (also not shown) to be easily connected to the LED boards for powering the LEDs. The power cord would typically be dropped from an overhead ceiling from which the luminaire is suspended.

Figure 5:
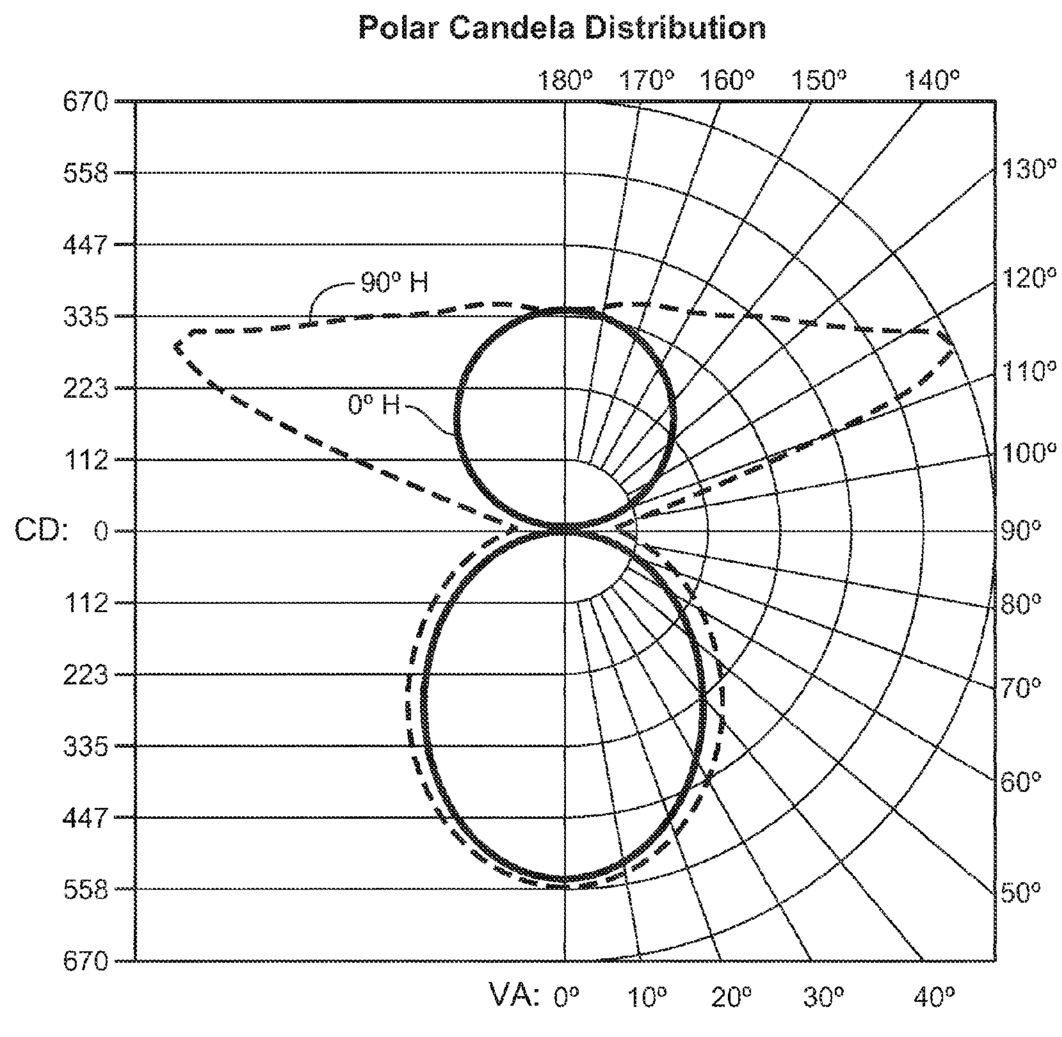
FIG. 5 is a representative light distribution pattern produced by the luminaire illustrated in the foregoing figures.

The luminaire 11 as above-described is a direct-indirect luminaire where light emitted by the LED strips 27, 29 emanates from the housing in up- and down-light distribution patterns such as illustrated in FIG. 5. While the illustrated embodiment shows a fractional amount of up-light being captured at the top of the sidewalls, it is contemplated that a fractional amount of down-light could instead or in addition be captured at the bottom of the housing sidewalls by providing sidewall light feed edges at the bottom of the sidewalls suitably oriented toward the source of direct lighting. It is further contemplated that the above-described scheme for injecting a fractional amount of source light into the housing sidewalls to produce a glow could be employed in a totally indirect luminaire as well as a totally direct luminaire, and could be employed in a wall or furniture mounted luminaire as well as a ceiling suspended or mounted luminaire. In a wall mounted luminaire, the luminaire would have only one observable sidewall facing away from the wall. In linear form luminaires having other cross-sectional shapes such as a circular shape the upwardly extending sidewalls of the luminaire would curve inwardly causing the light feed edges to be naturally oriented toward the optical control means in the housing. Thus, the in-turned edges 25 of the rectangular form sidewalls of the illustrated embodiment may not be necessary to provide a suitable orientation of the light feed edges.

It will be appreciated that the optical control means for directing a portion of the luminaire's source light to the light feed edge of the luminaire housing could be implemented by means other than the horseshoe lens described above, for example, by optical control means comprised of a combination of lens or lens and reflectors, or possibly even by a combination of reflectors only.

While the present invention has been described in considerable detail in the foregoing specification and the accompanying drawings, it will be understood that it is not intended that the invention be limited to such detail, except as may be necessitated by the following claims.

What we claim is:

1. A luminaire comprising:

a housing having at least one sidewall, a top opening, and a bottom through which light can travel, said housing sidewall having an observable outer surface and a light feed edge positioned at the top opening of the housing, and being characterized in that light introduced into the sidewall through the light feed edge thereof will propagate by internal reflections within the sidewall, a light source associated with the top opening of the housing, wherein light emitted by said light source emanates from the top opening in an indirect light distribution pattern, a light source associated with the bottom of the housing, wherein light emitted by said light source emanates from the bottom of the housing in a direct light distribution pattern, optical control means positioned at or near the level of the top opening of the housing for directing a portion of the light emitted by the light source associated with the top opening of the housing to the light feed edge of the sidewall of the housing, wherein said portion of light is introduced into the sidewall of the housing through the light feed edge thereof, said housing sidewall further being characteristic in that light propagating within the sidewall is extracted through the outer surface thereof to produce a secondary observable glow of light thereon.

2. The luminaire of claim 1 wherein, in addition to directing a portion said portion of the light emitted by said light source to the light feed edge of the housing sidewall, said optical control means determines the distribution pattern of the light emanating from said housing.

3. The luminaire of claim 1 wherein said optical control means includes at least one lens element positioned proximate to the light source associated with the top opening of the housing.

4. The luminaire of claim 1 wherein said optical control means includes at least one lens element positioned proximate to the light source associated with the top opening of the housing, said lens element having an internal cavity providing a light incident surface for the lens element for receiving light emitted by the light source associated with the top opening of the housing, and the light source associated with the top opening of the housing being positioned relative to the internal cavity of the lens element such that light emitted by the light source associated with the top opening of the housing is received by the light incident surface of the lens element.

5. The luminaire of claim 1 wherein said luminaire housing, including the at least one sidewall thereof, has a linear form, the light feed edge of said sidewall extends substantially the length of the sidewall, and the optical control means extends in proximity to said light feed edge for at least a portion of the length of said light feed edge.

6. The luminaire of claim 5 wherein said optical control means extends in proximity to said light feed edge for substantially the entire length of said light feed edge.

7. The luminaire of claim 1 wherein said luminaire housing has a linear square or rectangular form with a vertical linear sidewall having an inwardly turned light feed edge oriented in the direction of said optical control means, said inwardly turned light feed edge extends substantially the length of the sidewall, and the optical control means extends in proximity to said light feed edge for at least a portion of the length of said light feed edge.

8. The luminaire of claim 7 wherein said optical control means extends in proximity to said inwardly turned light feed edge for substantially the entire length of said light feed edge.

9. The luminaire of claim 1 wherein said luminaire housing has a symmetrical linear form with upwardly extending linear sidewalls having light feed edges oriented in the direction of said optical control means, said light feed edges extend substantially the length of said sidewalls, and said optical control means extends in proximity to both of said light feed edges for at least a portion of the length of said light feed edges.

10. The luminaire of claim 9 wherein said optical control means extends in proximity to said light feed edges for substantially the entire length of said light feed edges.

11. The luminaire of claim 1 wherein said the light source associated with the top opening of said housing includes a plurality of small area light sources and wherein said optical control means directs a portion of the light emitted by said small area light sources to the light feed edge of the housing sidewall.

12. The luminaire of claim 11 wherein the light source include associated with the top opening of said housing includes LEDs.

13. The luminaire of claim 1 wherein said housing sidewall is fabricated of a clear plastic material.

14. The luminaire of claim 1 wherein said sidewall has an inside and a substantially opaque reflective layer is provided on the inside of the sidewall.

15. The luminaire of claim 1 wherein said outer observable surface of said sidewall has a light dispersing satin finish which acts to extract light propagating within the sidewall through the outer observable outer surface thereof.

16. The luminaire of claim 1 wherein said sidewall contains micro-particles suspended therein which act to extract light propagating within the sidewall through the outer observable surfaces observable outer surface thereof.

17. A luminaire comprising:

a linear form housing having a length, a top and a bottom, and at least one linear form sidewall extending upward from the bottom to the top of the housing, said housing sidewall having an observable outer surface and terminating at an inwardly turned linear light feed edge at the top of said housing which extends substantially the length of said housing, said housing sidewall being characterized in that light introduced into the sidewall through the linear light feed edge thereof will propagate by internal reflections within the sidewall, a plurality of small area light sources distributed in and along the length of said housing for emitting light in a generally upward direction, a linear top lens element covering said small area light sources, said linear top lens element being formed to spread light emitted by the small area light sources above said housing in an indirect light distribution pattern such that a small portion of the light emitted by the small area light sources is introduced into the inwardly turned light feed edge of the housing sidewall, said sidewall further being characteristic in that light propagating within the sidewall is extracted through the outer surface thereof to produce a secondary observable glow of light thereon.

18. The luminaire of claim 17 wherein the linear top lens element covering the plurality of small area light sources has at least one bottom cavity providing an internal curved light incident surface for the lens element, and said small area light sources are positioned relative to the bottom cavity of the lens element such that light emitted by the small area light sources is received by the light incident surface of the lens element.

19. The luminaire of claim 17 wherein said luminaire housing has a symmetrical linear form with opposed upwardly extending linear sidewalls having opposed inwardly turned linear light feed edges oriented in the direction of the linear top lens element.

20. The luminaire of claim 19 wherein the linear top lens element is a symmetrical horseshoe shaped lens having a linear form, said horseshoe shaped lens being formed to spread the light emitted by said small area light sources such that a portion of the light is directed to each of the opposed inwardly turned linear light feed edges oriented in the direction of the horseshoe shaped top lens element.

21. The luminaire of claim 17 wherein said small area light sources are aligned and mounted on a small area light source board and wherein the linear top lens element sits on top of said light source board over the aligned small area light sources.

22. The luminaire of claim 17 wherein the linear form housing has a square or rectangular cross-sectional shape with a vertical linear sidewall having an inwardly turned light feed edge oriented in the direction of said linear top lens element, said inwardly turned light feed edge extends substantially the length of the sidewall, and the linear top lens element covering the small area light sources extends for at least a portion of the length of the inwardly turned light feed edge of said housing.

23. The luminaire of claim 22 wherein said linear top lens element extends for substantially the entire length of the inwardly turned light feed edge of said housing.

24. A luminaire comprising:

a symmetrical linear form housing having a length, a top and a bottom, and linear form opposed sidewalls extending between the bottom and the top of the housing, each of said housing sidewalls having an observable outer surface and terminating at an inwardly turned linear light feed edge which extends substantially the length of said housing, said opposed housing sidewalls being characterized in that light introduced into the sidewalls through the linear light feed edges thereof will propagate by internal reflections within the sidewalls, a source of light distributed substantially midway between the opposed housing sidewalls along the length of the housing for emitting light which emanates from the housing, and a horseshoe shaped linear lens element covering said source of light, said horseshoe shaped linear lens element being formed to spread the light emitted by the source of light in a substantially symmetrical light distribution pattern such that a small portion of the light emitted by the source of light covered by the horseshoe shaped linear lens element is introduced into the inwardly turned light feed edges of the opposed housing sidewalls, said opposed housing sidewalls further being characteristic in that light propagating within the sidewalls is extracted through the outer surfaces thereof to produce a secondary observable glow of light thereon.

25. The luminaire of claim 24 wherein said source of light is comprised of a plurality of small area light sources distributed in and along the length of said housing substantially midway between the opposed housing sidewalls.

26. The luminaire of claim 25 wherein said plurality of small area light sources are is comprised of a strip of LEDs.

27. The luminaire of claim 24 wherein the inwardly turned light feed edges of said housing sidewalls are located at the top of said housing and define a top opening in said housing, and wherein said horseshoe shaped lens element and the source of light covered thereby are positioned at or near the level of said top opening to spread the light emitted by the source of light in an indirect distribution pattern, a portion of which is introduced into the inwardly turned light feed edges of said sidewalls at the top of the housing.

28. The luminaire of claim 24 wherein said symmetrical housing has a top opening and a bottom opening through which light can travel and wherein a source of light is provided in said housing which is associated with the top opening of said housing, a source of light is provided in said housing which is associated with the bottom opening of said housing, light emitted by the light source associated with the top opening of said housing emanates from the top opening in an indirect light distribution pattern, light emitted by said light source associated with the bottom opening of said housing emanates from said opening the bottom of said housing in a direct light distribution pattern, the inwardly turned light feed edges of said housing sidewalls are positioned at the top opening of the housing, and said horseshoe shaped lens element covers the source of light which is associated with the top opening of said housing so as to spread the light emitted by the source of light associated with the top opening of said housing in a substantially symmetrical indirect light distribution pattern, a small portion of which is introduced into the inwardly turned light feed edges at the top of the opposed housing sidewalls.

29. The luminaire of claim 28 wherein the source of light associated with the top opening of the housing and covered by said horseshoe shaped linear lens element is comprised of a plurality of small area light sources distributed in and along the length of said symmetrical housing.

30. The luminaire of claim 29 wherein said plurality of small area light sources includes a strip of LEDs.

31. The luminaire of claim 24 wherein said horseshoe shaped linear lens element extends for substantially the entire length of the inwardly turned light feed edges of said housing sidewalls.

* * * * *